United States Patent
Jaenike (10) Patent No.: US 9,777,622 B2
(45) Date of Patent: Oct. 3, 2017

(54) ADJUSTABLE GUIDE VANE MECHANISM FOR A TURBINE, TURBINE FOR AN EXHAUST GAS TURBOCHARGER AND EXHAUST GAS TURBOCHARGER

(71) Applicant: IHI CHARGING SYSTEMS INTERNATIONAL GMBH, Heidelberg (DE)

(72) Inventor: Lorenz Jaenike, Heidelberg (DE)

(73) Assignee: IHI CHARGING SYSTEMS INTERNATIONAL GMBH, Heidelberg (DE)

( * ) Notice: Subject to any disclaimer, the term of this patent is extended or adjusted under 35 U.S.C. 154(b) by 703 days.

(21) Appl. No.: 14/588,449

(22) Filed: Jan. 1, 2015

(65) Prior Publication Data

US 2015/0132113 A1    May 14, 2015

Related U.S. Application Data

(63) Continuation-in-part of application No. PCT/EP2013/002101, filed on Jul. 16, 2013.

(30) Foreign Application Priority Data

Jul. 26, 2012   (DE) ................. 10 2012 106 789

(51) Int. Cl.
  *F02B 37/24* (2006.01)
  *F01D 17/16* (2006.01)
  *F01D 9/04* (2006.01)

(52) U.S. Cl.
  CPC .............. *F02B 37/24* (2013.01); *F01D 9/041* (2013.01); *F01D 17/16* (2013.01); *F01D 17/165* (2013.01);

(Continued)

(58) Field of Classification Search
  CPC .......... F02B 37/24; F01D 17/16; F01D 9/041; F01D 17/165; F01D 17/167; F05D 2240/50; F05D 2230/10; F05D 2220/40
  See application file for complete search history.

(56) References Cited

U.S. PATENT DOCUMENTS 8,262,346 B2 *  9/2012  Wengert ................ F01D 17/165
                                             415/163
8,376,696 B2 *  2/2013  Suzuki .................. F01D 17/165
                                             415/164

(Continued)

FOREIGN PATENT DOCUMENTS

DE   10 2006 018 055   10/2007
DE   10 2008 005 404    7/2009
EP        1 227 221     4/2006

*Primary Examiner* — Dwayne J White
*Assistant Examiner* — Adam W Brown
(74) *Attorney, Agent, or Firm* — Klaus J. Bach (57) ABSTRACT

In an adjustable guide vane mechanism for a turbine, comprising a bearing ring with a plurality of guide vanes rotatably supported on the bearing ring by means of guide vane shafts provided with actuating levers which are engaged by a rotatable ring, the rotatable ring comprises axially spaced radial inner and outer sections with a radially inclined center section joining the spaced radial inner and outer sections, the radially inner section being rotatably supported and the radially outer section extending around the actuating levers and having recesses in which the actuating levers are received for pivoting the actuating levers and the guide vanes upon rotation of the rotatable ring.

10 Claims, 6 Drawing Sheets

(52) U.S. Cl.
CPC ........ *F01D 17/167* (2013.01); *F05D 2220/40* (2013.01); *F05D 2230/10* (2013.01); *F05D 2240/50* (2013.01)

(56) References Cited

U.S. PATENT DOCUMENTS

| | | | |
|---|---|---|---|
| 8,944,747 B2* | 2/2015 | Sarri | F01D 17/165 415/1 |
| 9,017,017 B2* | 4/2015 | Sausse | F01D 17/165 415/160 |
| 9,103,229 B2* | 8/2015 | Eriksson | F01D 17/165 |

* cited by examiner

Fig. 1

Prior Art

Fig. 2

Prior Art

ADJUSTABLE GUIDE VANE MECHANISM FOR A TURBINE, TURBINE FOR AN EXHAUST GAS TURBOCHARGER AND EXHAUST GAS TURBOCHARGER

This is a continuation-In-Part application of pending international patent application PCT/EP2013/002101 filed 2013 Jul. 16 and claiming the priority of German patent Application 10 2012 106 789.9 filed 2012 Jul. 26

BACKGROUND OF THE INVENTION

The invention relates to an adjustable guide vane mechanism for a turbine, a turbine for an exhaust gas turbocharger as well as to an exhaust gas turbocharger for an internal combustion engine.

Patent specification EP 1 227 221 B1 discloses an, adjustable guide vane mechanism for a turbine. By means of the adjustable guide vane mechanism, the incoming flow of the exhaust gases discharged from a combustion engine into the turbine wheel can be conditioned. For this purpose, the guide mechanism comprises a number of adjustable guide vanes which are positioned in a nozzle duct in the exhaust gas guide portion, upstream of a wheel chamber in which the turbine wheel is rotatably mounted. The guide mechanism comprises a bearing ring with a plurality of guide vanes, with the guide vanes being rotatably supported on the bearing ring via guide vane shafts. Actuating levers are principally allocated to the guide vane shafts, which are formed to be engageable with a rotating ring. The rotating ring comprises recesses for accommodating the actuating levers.

The rotating ring is formed as an annular disk and is radially and axially supported. The axial and radial support is effected by means of a bearing ring. For friction reduction, the rotating ring comprises recesses at its bearing face opposite the bearing ring. Thereby, a surface contact between the rotating ring and the bearing ring and consequently the friction losses due to surface friction are reduced.

It is the principal object of the present invention to provide an adjustable guide vane mechanism with further reduced friction losses. It is another object of the invention to provide a turbine which has a higher operational reliability as well as to configure an exhaust gas turbocharger with improved efficiency.

SUMMARY OF THE INVENTION

In an adjustable guide vane mechanism for a turbine, comprising a bearing ring with a plurality of guide vanes rotatably supported on the bearing ring by means of guide vane shafts provided with actuating levers which are engaged by a rotatable ring, the rotatable ring comprises axially spaced radial inner and outer sections with a radially inclined center section joining the spaced radial inner and outer sections, the radially inner section being rotatably supported and the radially outer section extending around the actuating levers and having recesses in which the actuating levers are received for pivoting the actuating levers and the guide vanes upon rotation of the rotatable ring.

Thus, the rotating ring is formed in such a manner that it may accommodate the actuating levers in its recesses, while a first portion, which is spaced from the second portion which accommodates the actuating levers, is used to rotatably support the rotating ring. This means that only one portion of the rotating ring, i. e. the first portion of the rotating ring, is used for supporting the rotating ring whereby potential friction surfaces are considerably reduced, which results in lower friction losses.

Due to the radially and axially spaced arrangement of the first and second portions, an essentially Z-girder profile-type rotating ring may be formed. Even with a small thickness, the rotating ring exhibits high stability and elasticity. In addition, a radial gap between the rotating ring and a carrier ring may be adjusted more precisely. In addition to providing a better wear behavior, the jamming tendency of the rotating ring is reduced so that the operational reliability of the adjustable guide vane mechanism is significantly improved.

In a particular embodiment of the inventive guide mechanism, the rotating ring in its first portion is formed such that it can be radially supported by a bearing ring supporting the guide vanes. This means that no further measures, such as additional components, are required for providing a radial bearing clearance, whereby a considerable cost reduction of the inventive adjustable guide vane mechanism is achieved.

In an alternative embodiment of the inventive guide mechanism, the rotating ring can be radially supported at its first portion on the guide vane shaft, whereby in addition to the above mentioned advantageous cost reduction a weight reduction is achievable, because the bearing ring can be manufactured with a considerably reduced axial extension. At the same time, a further reduction of the friction losses comes into effect because contact surfaces between the rotating ring and the guide vane shaft are reduced to nearly line contacts due to the cylindrically shaped guide vane shaft. A further major improvement may be achieved by the unidirectional motion of the contact surfaces, which reduces the relative velocity compared to the conventional concepts.

In this alternative embodiment, a bearing means, e. g. in the form of a bearing bushing, may advantageously be provided for the support of the rotating ring at the guide vane shaft. Because machining of a surface area of the bearing bushing can be carried out more easily, a surface roughness of the bearing bushing may be cost effectively obtained, by which a further reduction of friction losses in the area of the contact surface between the rotating ring and the bearing bushing can be accomplished.

In another advantageous embodiment of the inventive guide mechanism, a groove is provided for securing the radial support. For the support of the rotating ring on the bearing ring, this groove is to be formed in the bearing ring, or in the alternative embodiment, for a support of the rotating ring on the guide vane shaft, the guide vane shaft or bearing bushing, respectively, comprises this groove. The groove itself may be cost effectively formed, e. g. by means of a machining method.

In another advantageous embodiment, the support of the rotating ring is realized by means of antifriction bearings. This embodiment allows to completely eliminate any lubricant which might possibly reach the exhaust gas via the adjustable guide vane mechanism, because antifriction bearings, such as e. g. ball bearings, roller bearings or needle bearings, enable a sealed bearing cage. The lubricant itself remains exclusively within the bearing cage and does not penetrate into e. g. areas of the adjustable guide vane mechanism through which exhaust gas may flow. In addition, antifriction bearings exhibit an improved friction behavior combined with improved wear behavior compared to friction bearings.

In another embodiment, the recesses in the rotating ring comprise at least partially a web-shaped wall which extends in the axial direction. This embodiment permits a reduction of the thickness of the rotating ring, because actuating levers which are accommodated in the recesses may still be reliably guided by means of the axially extending walls forming the recesses. If the rotating ring were formed with a very small thickness, actuating levers might possibly no longer be guided reliably in the recesses without these walls, which could result in failure of the adjustable guide vane mechanism. This can be avoided by means of the walls with a simultaneous weight reduction of the rotating ring by a reduction of the thickness of the rotating ring.

In another cost effective embodiment of the inventive guide mechanism, the rotating ring may be made by punching. In particular for thin components, punching is a very cost effective and simple manufacturing method. Occasionally, so-called punching burrs adhere to components made by the punching method. Previously, contacts between the rotating ring outer diameter and a circlip encompassing the rotating ring could occur under certain operating conditions, which could have resulted in jamming when the rotating ring was insufficiently deburred. This drawback is, however, eliminated with the rotating ring of the inventive adjustable guide vane mechanism due to its shape, so that an efficient and satisfactory operating behavior may be realized by means of the cost effectively manufactured rotating ring.

A turbine for an exhaust gas turbocharger including an exhaust gas guide portion with a turbine wheel which is rotatably mounted in a wheel chamber of the exhaust gas guide portion comprises in its exhaust gas guide portion an inventive adjustable guide vane mechanism, wherein the guide vanes of the adjustable guide vane mechanism are positioned in a nozzle duct upstream of the wheel chamber. This turbine has a significantly improved reliable operating behavior, because the inventive adjustable guide vane mechanism nearly completely precludes the failure of the turbine due to jamming of the rotating ring.

In particular, an inventive exhaust gas turbocharger with an inventive turbine is provided which on the one hand has a very high efficiency due to the reduction of friction losses and, on the other hand, has a remarkable operating reliability whereby failure of the exhaust gas turbocharger is minimized. This again leads to a reduction of exhaust gas emissions, in particular in connection with combustion engines provided in vehicles, because a reliable operating behavior of the exhaust gas turbocharger is ensured and thus an optimized harmonization between the exhaust gas turbocharger and the combustion engine can be achieved.

The invention will become more readily apparent from the following description of particular embodiments thereof with reference to the accompanying drawings:

DESCRIPTION OF THE VARIOUS EMBODIMENTS OF THE INVENTION

An exhaust gas guide portion (not shown in detail) with through-flow of an exhaust gas turbocharger is provided in an exhaust gas duct (not shown in detail) of a combustion engine (not shown in detail) which is an Otto engine or a Diesel engine, The exhaust gas turbocharger also comprises a fresh air guide portion (not shown in detail) with through-flow and a bearing portion (not shown in detail) which is arranged in a suction duct (not shown in detail) of the combustion engine.

The exhaust gas turbocharger comprises a rotor assembly (not shown in detail) with a compressor wheel (not shown in detail) for suction and compression of combustion air, a turbine wheel (not shown in detail) for the expansion of exhaust gas as well as a shaft (not shown in detail) with an axis of rotation, which non-rotatably connects the compressor wheel with the turbine wheel. The shaft is rotatably supported in the bearing portion of the exhaust gas turbocharger, which is positioned between the air guide portion and the exhaust gas guide portion.

For the inflow of the exhaust gas into the exhaust gas guide portion, an inlet duct (not shown in detail) is formed in the exhaust gas guide portion. The inlet duct serves for conditioning the exhaust gas which, during operation of the combustion engine, rotates the turbine wheel. By means of the shaft, the compressor wheel is also rotated, so that combustion air is sucked in and compressed.

A spiral duct (not shown in detail) is arranged downstream of the inlet duct in the exhaust gas guide portion, which provides for a rotationally symmetrical flow. The spiral duct is also formed as a connecting duct between the inlet duct and nozzle duct (not shown in detail) which is disposed downstream of the spiral duct. A wheel chamber (not shown in detail) is provided downstream of the nozzle duct in the exhaust gas guide portion, in which the turbine wheel is rotatably mounted. The exhaust gas guide portion comprises an outlet duct (not shown in detail) downstream of the wheel chamber for discharging the exhaust gas from the exhaust gas guide portion.

In order to achieve a maximum exhaust gas turbocharger efficiency both at low loads and low speeds as well as at high loads and high speeds of the combustion engine, the exhaust gas is guided by means of an adjustable guide vane mechanism 1 which is arranged in the exhaust gas inlet portion.

Figure 1:
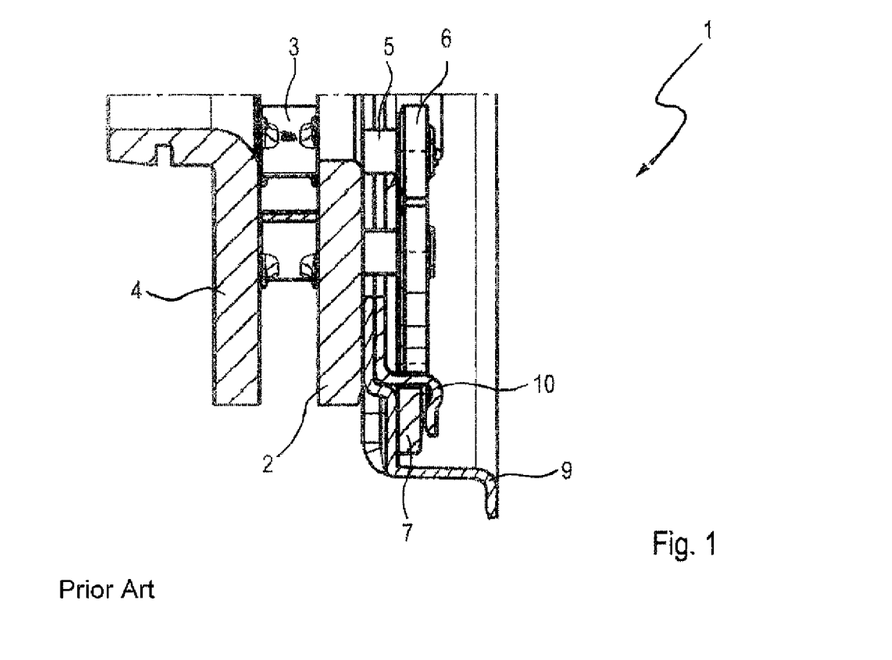
FIG. 1 shows a sectional view through an adjustable guide vane mechanism according to the state of the art.

FIG. 1 shows a guide mechanism 1 according to the state of the art. The guide mechanism 1 is formed so that it may annularly encompass the turbine wheel and comprises a bearing ring 2 for accommodating guide vanes 3 which are provided for flow conditioning. The guide vanes 3 are rotatably supported on the bearing ring 2.

The bearing ring 2 is positioned in the exhaust gas guide portion so that the guide vanes 3 are arranged in the nozzle duct. A contour sleeve 4 is positioned opposite the bearing ring 2 for flow conditioning and for a simplified assembly of the guide mechanism 1.

For the rotatable support of the guide vanes 3 on the bearing ring 2, a guide vane shaft 5 is provided for each guide vane 3, and is non-rotatably connected to the guide vane, which, thereby, is rotatably supported on the bearing ring 2. For rotating the guide vane shaft 5 and thus the guide vane 3, the guide vane shaft 5 comprises an actuating lever 6 at the end facing away from the guide vane 3, which is also non-rotatably connected is the guide vane shaft 5.

Figure 2:
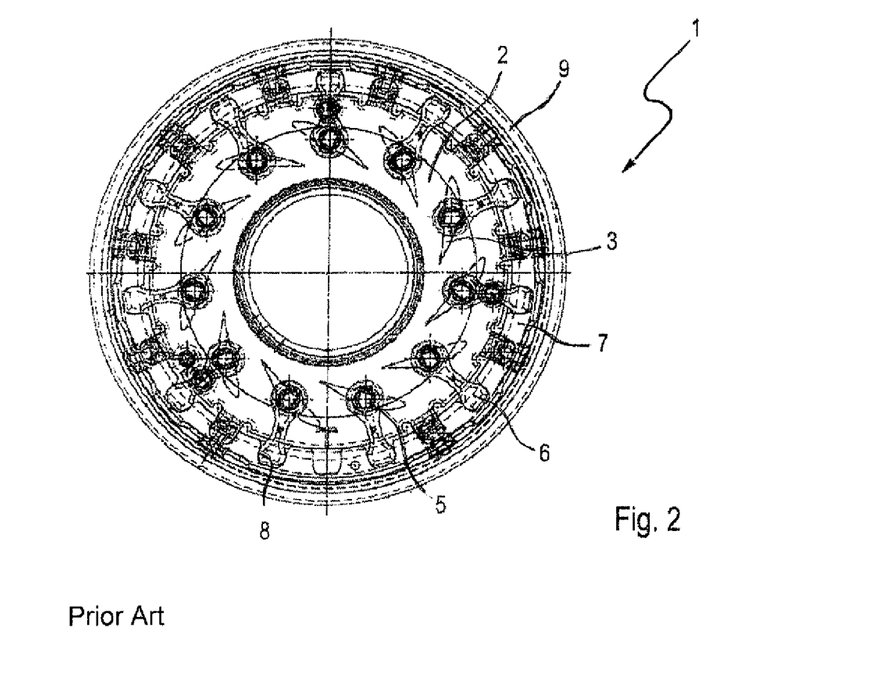
FIG. 2 shows a plan view of the guide mechanism according to FIG. 1.

The rotational movement of the guide vanes 3 can be initiated by means of a rotating ring 7 which is positioned coaxially with the bearing ring 2 in the adjustable guide vane mechanism 1. The rotating ring 7 comprises recesses 8 in which the ends of the actuating levers 6 are engaged, and which preferrably face away from the guide vane shaft 5.

For securing the rotating ring 7, the adjustable guide vane mechanism 1 according to the state of the art comprises a support ring 9 which provides for the axial support of the rotating ring 7. The rotating ring 7 is additionally axially secured by a clamping ring 10, wherein the support ring 9 and the clamping ring 10 are positioned and formed in such a manner that the rotating ring 7 is rotatably disposed between the support ring 9 and the clamping ring 10. The radial support is effected by means of the clamping ring 10 at an inner diameter of the rotating ring 7.

Figure 3:
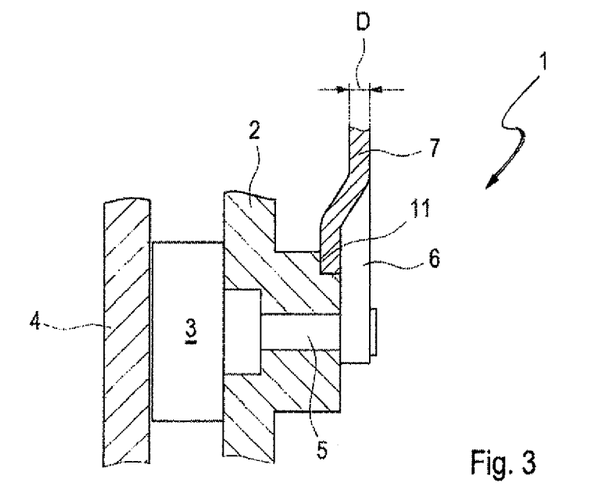
FIG. 3 shows a sectional view through an adjustable guide vane mechanism of a first variant of the invention.

For the reduction of the number of components, on the one hand, and the size of friction surfaces, on the other hand, the rotating ring 7 of the inventive guide vane mechanism 1 is formed so as to directly or indirectly encompass the guide vane shafts 5 in an area of the corresponding guide vane shaft 5 between the respective guide vane 3 and the actuating lever 6 allocated to the respective guide vane 3, whereby synchronously the reception of the respective actuating levers 6 in the recesses 8 of the rotating ring 7 is formed. In other words, the rotating ring 7 has a two-dimensional profile, that is, in radial cross-section, a dish-like shape, similar to a Z-girder profile or a hook-type profile. The rotating ring 7 comprises an annular flat first portion 71, which is referred to in the following by first ring 71, a second. larger diameter annular portion 72, which is axially spaced from the first portion 71 and is referred to in the following by second ring 72 and an annular an annular, radially inclined third portion 73, which is referred to in the following by third ring 73 and thus the rotating ring 7 is formed by a first ring 71, a second ring 72 and a third ring 73.

The first ring 71 is connected with the second ring 72, via the third radially inclined ring 73, that is the first and second rings 71, 72 are co-axial but radially and axially spaced from one another. The third ring 73 is to be seen as sort of a bridge member for spanning the axial offset of the first ring 71 and the second ring 72. It is fixedly connected with the first ring 71 on the outer circumference of the first ring 71 and fixedly connected with the second ring 72 at the inner circumference of the second ring 72.

This connection need not necessarily be formed over the entire circumference, but is at least formed in portions over the circumference of the rotating ring 7 so that in portions ring sections of the first ring 71 and/or of the second ring 72 and/or of the third ring 73 are provided. To reduce friction losses between the rotating ring 7 and the bearing ring 2, it is also possible in the preferred manufacturing method of punching or pressing so-called beads into the rotating ring 7 and thus into at least one of the three rings, the first ring 71, the second ring 72 and the third ring 73.

Figure 4:
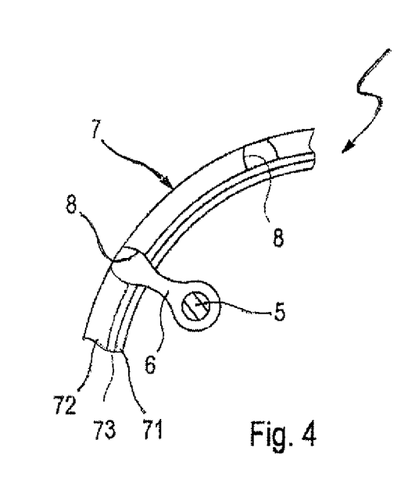
FIG. 4 shows a plan view of a section of the adjustable guide vane mechanism according to FIG. 3.

In a first variant, the rotating ring 7 of the inventive guide vane mechanism 1 is positioned as shown in FIG. 3. The rotating ring 7 is supported on the bearing ring 2 both radially and axially by means of the first ring 71. For this purpose, the bearing ring 2 comprises a step 11 in an area facing the actuating levers 6. According to FIG. 4, the recesses 8 for accommodating the actuating levers 6 are formed in the second ring 72 at the radially inner circumference thereof so that the second ring 72 of the rotating ring 7 is positioned facing the actuating levers. In this exemplary embodiment, the second ring 72 is therefore annularly formed only in portions, that is gaps are provided at the annular inner circumference thereof by the recesses accommodating the actuating levers 6.

Figure 5:
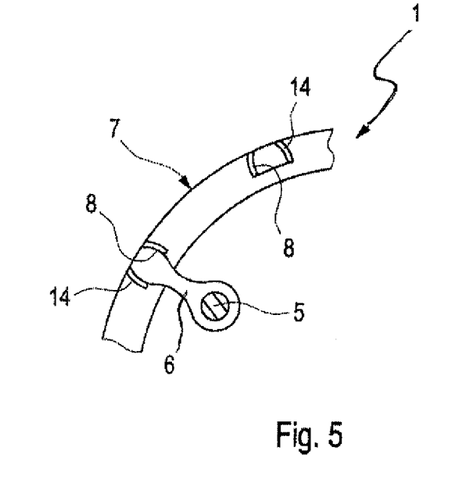
FIG. 5 shows a plan view of a section of the adjustable guide vane mechanism according to FIG. 3 with a rotating ring in an alternative embodiment.
Figure 6:
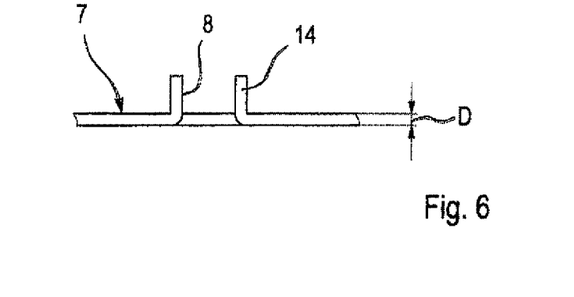
FIG. 6 shows a development of a section of the rotating ring according to FIG. 5.

In an exemplary embodiment a groove 12 is provided in the bearing ring 2 for a secured guidance of the rotating ring 7 to accommodate an inner surface of the first ring 71 facing the bearing ring 2. Different views of FIGS. 5 and 6 show an alternative exemplary embodiment of the rotating ring 7. The recesses 8 comprise at least partially a web-shaped wall 14, with the wall 14 extending in the axial direction. This wall 14 allows a reduction of the thickness D of the rotating ring 7, because even with a small thickness of the rotating ring 7 the wall 14 allows its support on the actuating levers 6 and thus the movable formation of the actuating levers 6 even with a small thickness D of the rotating ring 7.

Figure 7:
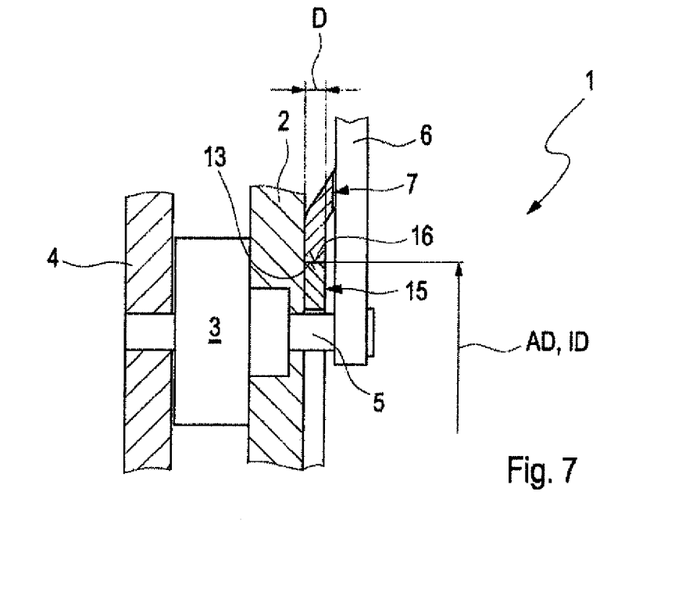
FIG. 7 shows a sectional view of the inventive adjustable guide vane mechanism in a second variant.
Figure 8:
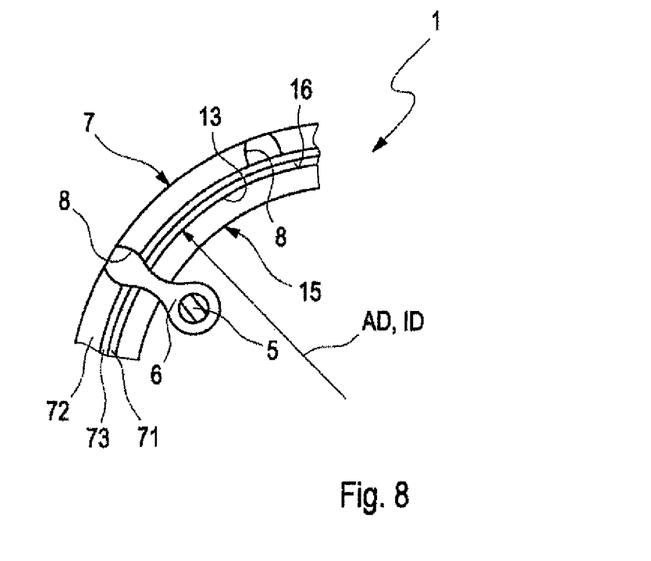
FIG. 8 shows a plan view of a section of the adjustable guide vane mechanism according to FIG. 7.

A second variant of the inventive adjustable guide vane mechanism 1 is formed according to FIG. 7 or to FIG. 8, respectively. A support ring disk 15 is provided, with this support ring disk 15 having an outer diameter AD which corresponds to an inner diameter ID of the rotating ring 7. Thus, the rotating ring 7 extends around the support disk 15. The support disk 15 and the rotating ring 7 are arranged coaxially, so that the rotating ring 7 is radially supported via its inner surface 13 on an outer surface 16 of the support disk 15. The support disk 15 is attached non-rotatably by suitable fastening means e. g. bolts on the bearing ring 2.

Figure 9:
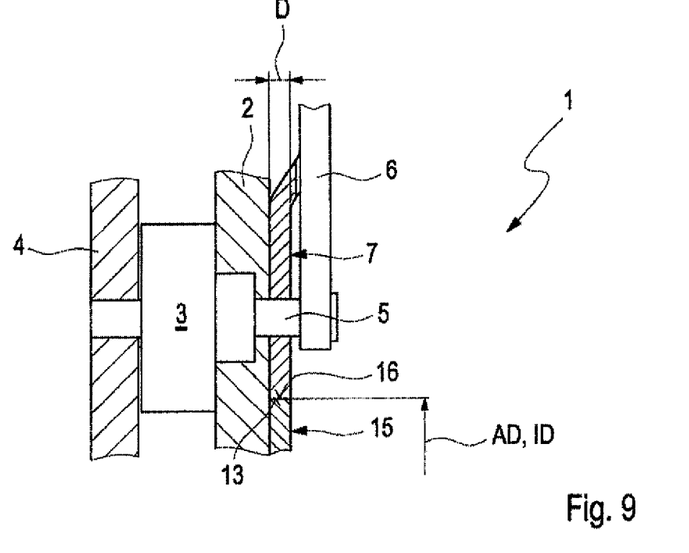
FIG. 9 shows a sectional view of the inventive adjustable guide vane mechanism in a third variant.

In a third variant, the inventive adjustable guide vane mechanism 1 is configured according to FIG. 9. Here, the rotating ring 7 is also radially supported by means of a support disk 15, as shown in the exemplary embodiment of the second variant, however, in this third variant, the support disk 15 has a smaller outer diameter AD compared to the second variant, while the rotating ring 7 because it is supported on the support disk 15, has a smaller diameter ID so as to provide for reduced bearing friction. In this variant, the support disk 15 is also fixed at the bearing ring 2 by suitable fastening means. However, the rotating ring needs to be provided with annularly elongated openings 18 as shown in FIG. 11 to permit rotation of the rotating ring 7.

Figure 10:
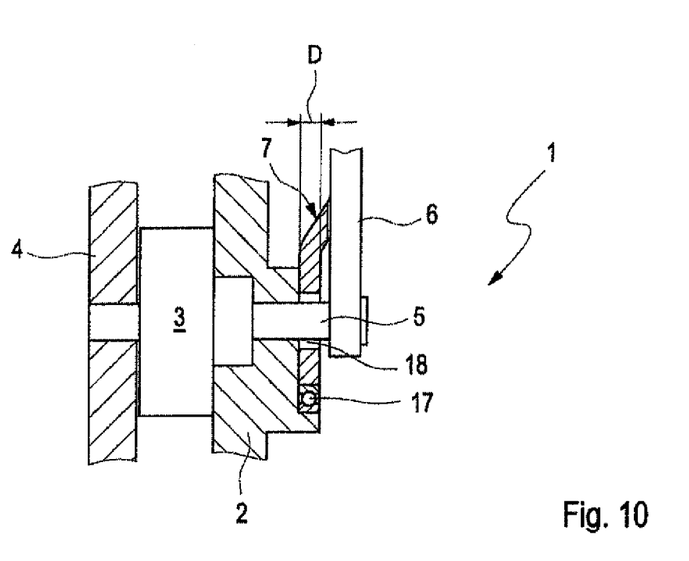
FIG. 10 shows a sectional view of the inventive adjustable guide vane mechanism in a fourth variant.
Figure 11:
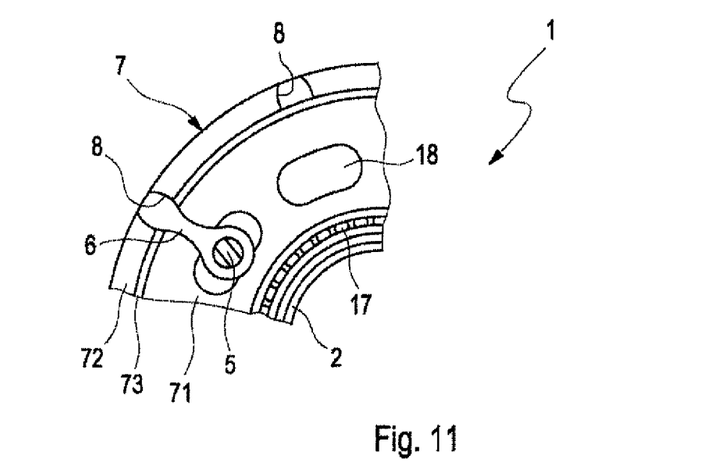
FIG. 11 shows a plan view of a section of the adjustable guide vane mechanism according to FIG. 10.

The exemplary embodiment of a forth variant according to FIG. 10 or to FIG. 11, respectively, comprises a rotating ring 7 which is supported by means of antifriction bearings 17, e. g. ball bearings, at the bearing ring 2. Here again, the rotating ring 7 is provided with annularly elongated openings 18 in the area of the guide vane shafts 5, which fully penetrate the rotating ring 7 in the axial direction in order to permit rotation of the rotating ring 7.

Figure 12:
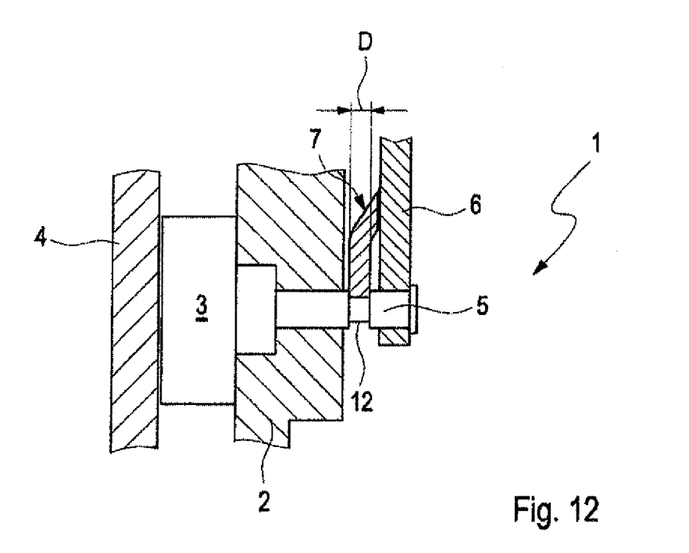
FIG. 12 shows a sectional view f the inventive adjustable guide van in a fifth variant.

The inventive adjustable guide vane mechanism 1 in an exemplary embodiment in a fifth variant according to FIG. 12 comprises the rotating ring 7 which is radially and axially supported in a groove 12 formed in the guide vane shaft 5.

Figures 13, 14:
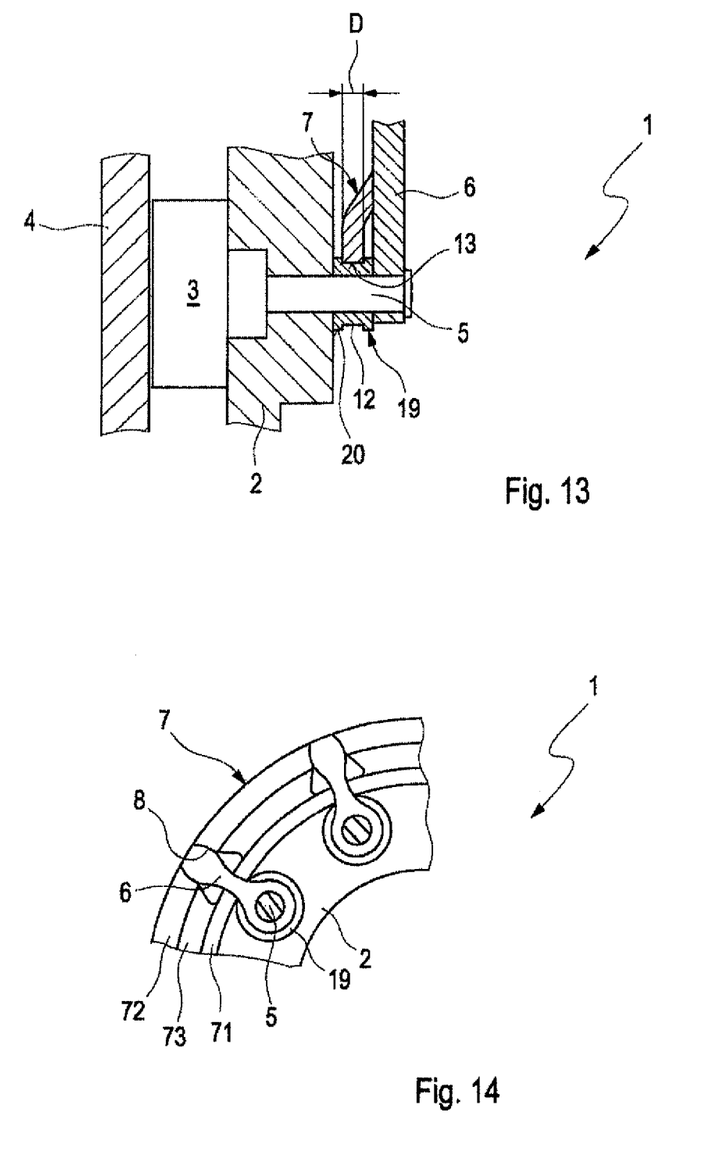
FIG. 13 shows a sectional view of the inventive adjustable guide vane mechanism in a sixth variant.
FIG. 14 shows a plan view of a section of the adjustable guide vane mechanism according to FIG. 13.

In a sixth variant according to FIG. 13 or to FIG. 14, respectively, the guide vane shaft 5 comprises a bearing sleeve 19, wherein the bearing sleeve 19 is supported by the guide vane shaft 5. The bearing sleeve 19 comprises the groove 12 in its outer surface 20 for the secure radial and axial support of the rotating ring 7 is which is held with its inner surface 13 in the groove 12.

The rotating ring 7 is ideally manufactured by means of a cost effective punching method.

What is claimed is:

1. An adjustable inlet guide vane mechanism for a turbine, comprising a bearing ring (2), a plurality of guide vanes (3) rotatably supported on the bearing ring (2) via guide vane shafts (5) provided with actuating levers (6) for pivoting the guide vanes (3), a rotatable ring (7) in the form of a dished annular disc supported on the bearing ring (2) and including a first radially inner flat portion (71) disposed adjacent the bearing ring (2), the rotating ring (7) further including, a second, radially outer, flat annular portion (72) axially spaced from the first radially inner portion (71) of the rotatable ring (7) so as to extend around the actuating levers (6) and being provided at its radially inner circumference with recesses (8) receiving the actuating levers (6) for pivoting the actuating levers upon rotation of the rotatable ring (7), the first and the second flat annular portions (71, 72) being joined by a third portion (73) of the rotatable ring (7) which third portion (73) extends axially inclined between the first and the second portions (71, 72).

2. The adjustable guide vane mechanism according to claim 1, wherein the rotating ring (7) is radially supported on the bearing ring (2) via its first portion (71).

3. The adjustable guide vane mechanism according to claim 1 wherein the rotating ring (7) is radially supported on the guide vane shafts (5) by means of its first portion (71).

4. The adjustable guide vane mechanism according to claim 3, wherein the guide vane shafts (5) comprise a bearing device (19) for supporting the rotating ring (7) on the guide vane shaft (5).

5. The adjustable guide vane mechanism according to claim 2, wherein a groove (12) is provided for the radial and axial support of the rotating ring (7) on the guide vane shafts (5).

6. The adjustable guide vane mechanism according to claim 2, wherein the rotating ring (7) is supported on the bearing ring (2) by an antifriction bearing (17).

7. The adjustable guide vane mechanism according to claim 1, wherein the recesses (8) in the rotating ring (7) comprise web-shaped walls (14), which extends in the axial direction.

8. The adjustable guide vane mechanism according to claim 1, wherein the rotating ring (7) is manufactured by punching.

9. A turbine for an exhaust gas turbocharger, comprising a turbine with an exhaust gas guide portion with a turbine wheel which is rotatably mounted in a wheel chamber of the exhaust gas guide portion, wherein the exhaust gas guide portion comprises an adjustable guide vane mechanism (1) according to claim 1, with the guide vanes (3) of the adjustable guide vane mechanism (1) being positioned in a nozzle duct upstream of the wheel chamber.

10. An exhaust gas turbocharger with a turbine according to claim 9.

\* \* \* \* \*